Aug. 11, 1931.  J. B. WARDWELL  1,818,875
HEADLIGHT
Original Filed Aug. 25, 1925  3 Sheets-Sheet 1
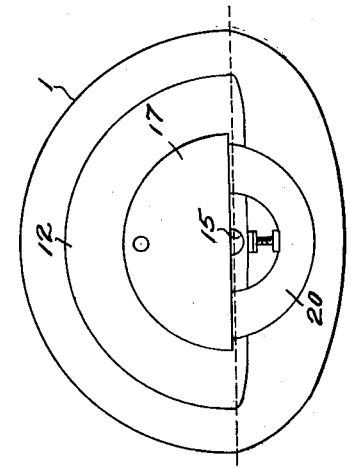
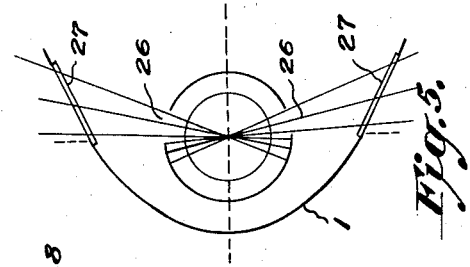
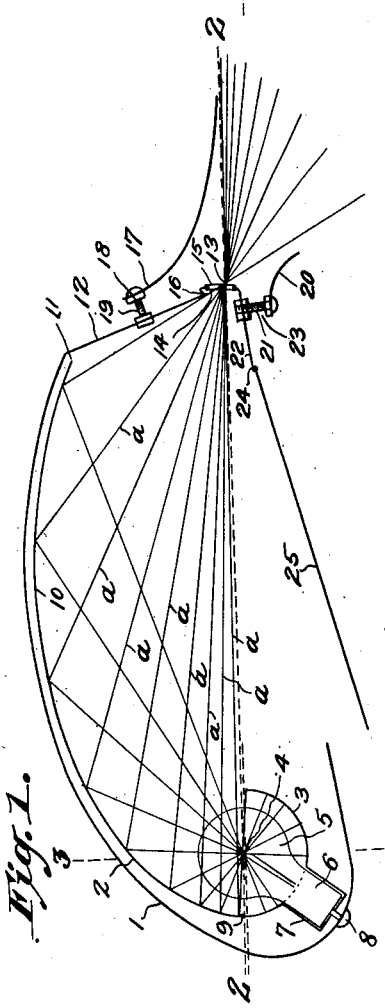
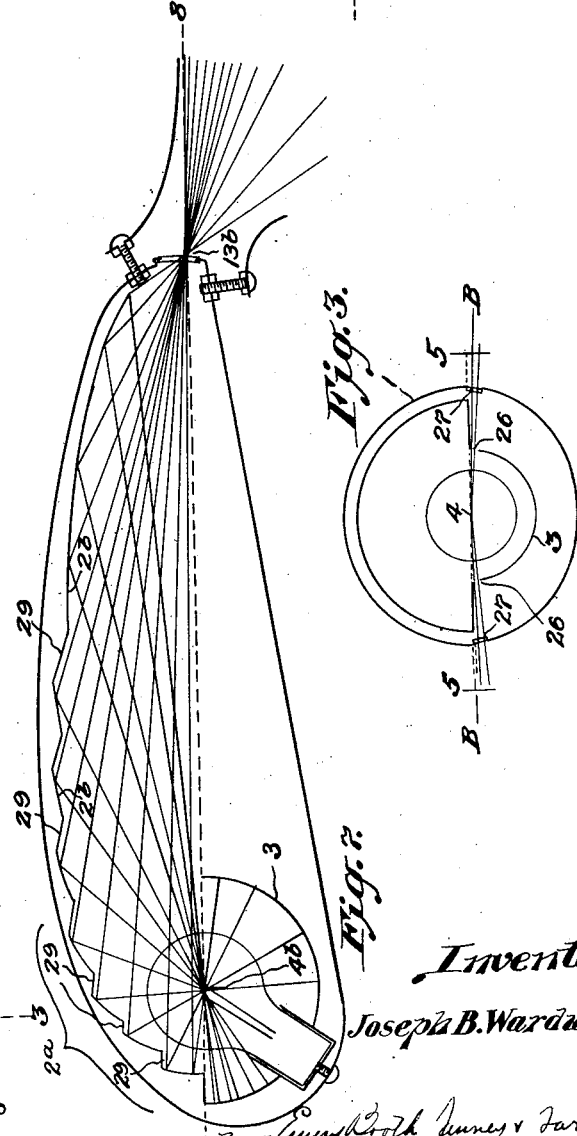
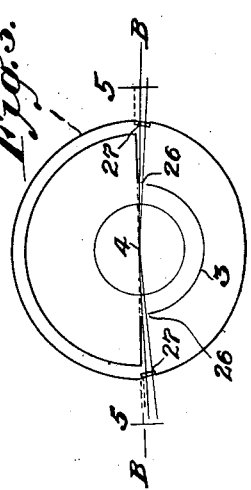
Inventor.
Joseph B. Wardwell,
by Emery Booth Janney & Varney
Attys.

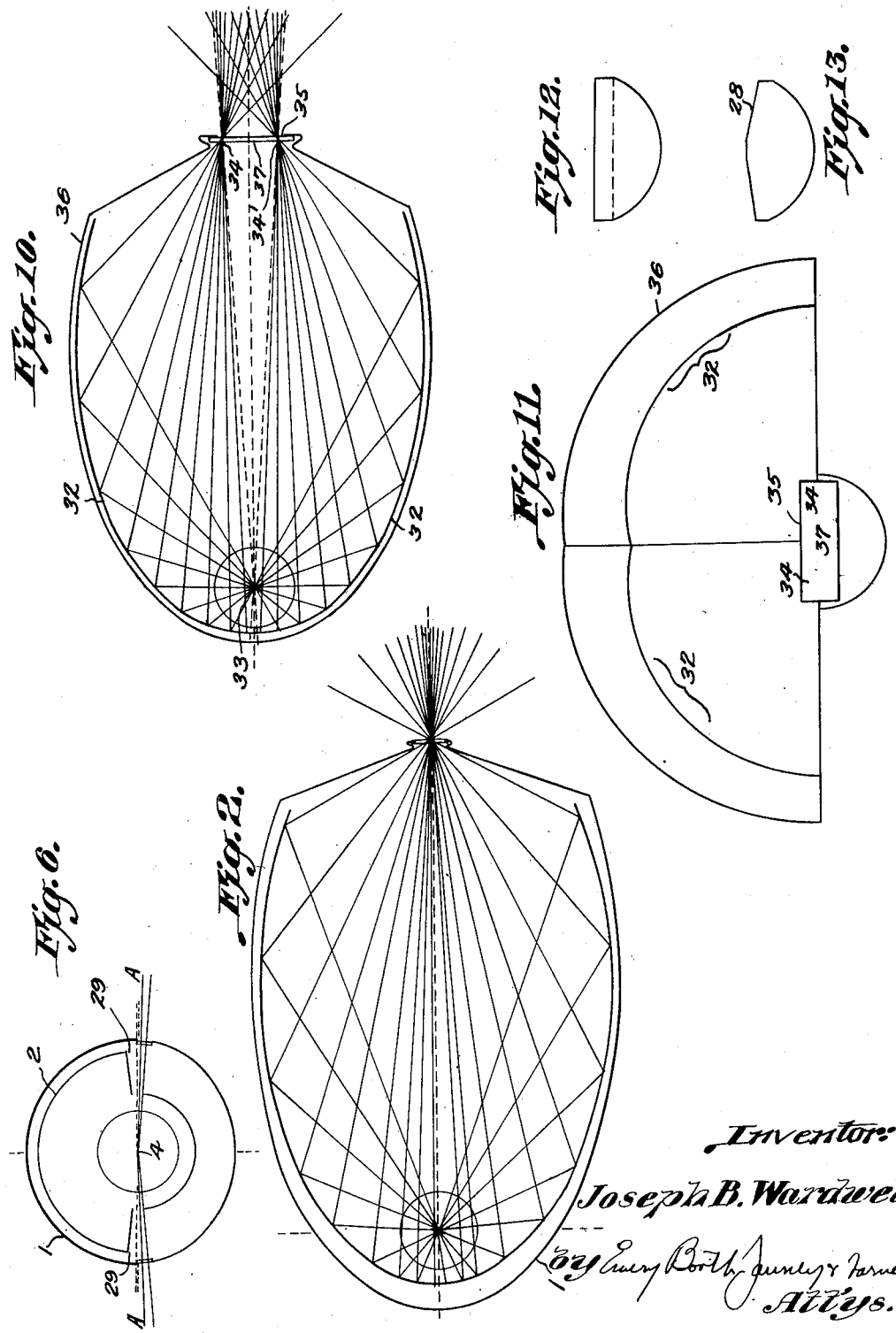

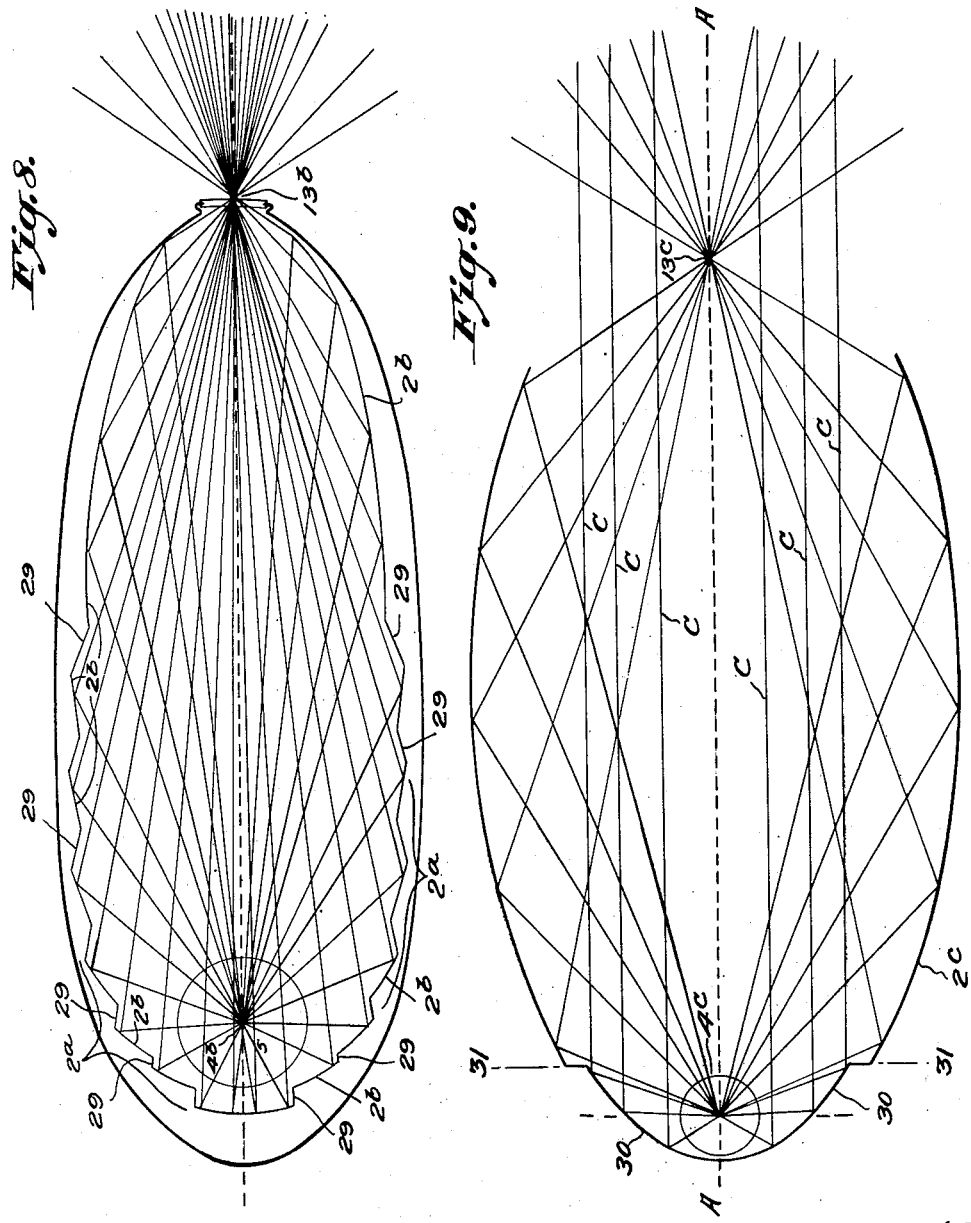

Patented Aug. 11, 1931

1,818,875

UNITED STATES PATENT OFFICE

JOSEPH BRADFORD WARDWELL, OF STAMFORD, CONNECTICUT

HEADLIGHT

Application filed August 25, 1925, Serial No. 52,258. Renewed June 23, 1930.

This invention aims to provide a headlight particularly suitable for use on motor and other vehicles for safety, economically and effectively illuminating the path of the vehicle in such a manner as to substantially obscure, above a definite plane, any rays of light tending to dangerously dazzle the eyes of approaching pedestrians or motorists.

In the accompanying drawings wherein I have shown merely for illustrative purposes, certain embodiments of the invention:

Fig. 1 is a vertical longitudinal section in diagrammatic form of a headlight constructed in accordance with this invention wherein some of the rays of light are indicated by relatively fine lines;

Fig. 2 is a horizontal longitudinal section taken substantially on the line 2—2 of Fig. 1, also representing some of the rays of light projected from the light source;

Fig. 3 is a vertical transverse section taken approximately on the line 3—3 of Fig. 1;

Fig. 4 is a front elevation of the headlight;

Fig. 5 is a detail horizontal section taken on the line 5—5 of Fig. 3;

Fig. 6 is a vertical transverse section similar to Fig. 3 but showing a slightly modified arrangement of the ellipsoidal reflector;

Fig. 7 is a vertical longitudinal section through the major axis of a modified form of headlight similar to that shown in the preceding figures but embodying a stepped ellipsoidal reflector;

Fig. 8 is a horizontal longitudinal section taken substantially on the major axis 8—8 of the embodiment shown in Fig. 7;

Fig. 9 is a diagrammatic plan section taken on the major axis of another modified form of reflector;

Fig. 10 is a horizontal longitudinal section taken substantially on the major axis of still another modification of the invention showing a modified ellipsoidal reflecting surface;

Fig. 11 is a front view of the reflector shown in Fig. 10;

Fig. 12 is a diagram illustrating a pattern of light capable of being projected by the headlight shown in Figs. 1 to 5 inclusive; and Fig. 13 is a diagram illustrating a pattern of light produced by the headlight embodying characteristics of that shown in Fig. 6.

Referring to the drawings, particularly Figs. 1 to 5 inclusive, 1 indicates a casing of appropriate shape and form to house the various elements of the headlight which herein include reflector or light-redirecting means comprising an ellipsoidal part 2 arranged above a substantially horizontal plane 2—2 preferably containing the major axis of said reflector part 2, and a spheroidal part 3 underlying said plane 2—2 and positioned adjacent the rear end of said ellipsoidal part.

The center of the spheroidal part 3 of said reflector, as indicated at 4, herein coincides with the rear focal point of the ellipsoidal part 2 and this center likewise substantially coincides with the axis of a source of light such, for example, as the filament of an electric bulb 5 but it is to be understood that the invention is not limited to electric lighting means. Desirably the bulb 5 has a stem 6 arranged to fit a receptacle or socket 7, the latter inclined rearwardly in and with respect to said casing and being provided with adjusting means, such as a screw 8, which is accessible from the exterior of said casing and is adapted to adjust the stem 6 within predetermined limits longitudinally of said socket.

As will be obvious from the drawings, a principal function of the spheroidal or auxiliary part 3 of the reflector means is to cause rays emitted downwardly from the source of light to be redirected back through a small area about the source of light, whereby these downwardly emitted rays are projected by the ellipsoidal or main part 2 of the reflector means to form a pattern of twice-reflected light to reinforce portions of the pattern of once-reflected light formed by the projection by said ellipsoidal part of rays emitted upwardly from the source. For the sake of economy in manufacture, the front portions of the spheroidal part 3 have in this embodiment been given an additional function which relates to the provision of the lower of a pair of obturator means, as will hereinafter be referred to more fully.

The ellipsoidal reflector 2 shown in Fig 1, is of arcuate transverse formation, herein, for example, approximately semi-circular; that is in planes substantially at right angles to the major axis 2—2. The radius of each cross section is gradually increased from the rearmost point 9 to the highest point 10, whence it gradually decreases toward the forward edge 11.

Desirably the arcuate portions of said reflector terminate substantially at the plane 2—2 as indicated by the line B—B (Fig. 3) at which plane the spheroidal reflector 3 also terminates. The front end of the casing 2 is, in the present example, closed by an opaque, semi-transparent or light-modifying wall 12 which may be, and herein is, substantially radially disposed with respect to the forward focal point 13 of the reflector part 2. This end is provided with an aperture 14 desirably of small diameter and closed by means of a glass window 15, said window being of sufficient size to emit all, or substantially all, rays of light reflected from the source by said reflector parts 2 and 3. The exact size of the window will depend upon the divergence of the reflected rays. Desirably said aperture is arranged approximately at the front focal point 13 of said reflector and thereby requires only a very small window for the emission of the light rays so that, from in front of the headlight and on a level with or above its axis, little if any light will be visible except the pattern upon the roadway. By reason of the location of said focal point near said window, sufficient heat will be created thereby to prevent any accumulation thereon of snow or ice in cold weather.

Furthermore, the smallness of the window makes it easy to keep clean and free from dirt and, this is further assisted, particularly as regards rain drops, by providing a groove or gutter 16 in the front wall 12 of said casing, at least half way therearound so as to carry off to one side, all surplus water collected upon the front 12 of said casing.

Mounted upon the casing 1 is a visor 17 constructed of opaque or semi-opaque material so as to entirely or only partly prevent light from passing therethrough, said visor being inclined downwardly and forwardly substantially to the plane 2—2. The principal function of the visor is to provide a forward or upper obturator which cooperates with the aforesaid lower or rear obturator substantially to obscure both the source of light and the reflecting surfaces from opposing eyes located in planes above the plane 2—2. This arrangement also prevents any substantially unmodified intense rays from being emitted through the window 15 without passing over the rear obturator (namely, the aforesaid front portions of the spheroidal part 3) and under the visor as the forward obturator. It will be obvious that the effective edges of the two obturators cooperate to define the upper limiting boundary of the projected beam, the maximum angle of elevation of which is thus positively determined by the aiming of the headlight relative to the car. It is within the scope of the invention to provide whereby the visor 17 will wholly or only partly obscure the window 15 from opposing eyes located just above said plane 2—2.

A second function of the visor 17 is to prevent an accumulation of mud or rain upon the front face of the window 15, this being made possible by the inclination of said visor which deflects rain or spattered mud to a point above the top of the headlight. Any appropriate means may be provided for mounting the visor 17 upon said casing but herein I have shown a screw 18 secured in the front wall 12 of said housing and preferably providing a space 19 between said visor and said front wall.

By placing the upper end of the visor at a slight distance in front of said wall 12, a narrow passage will be provided through which a circulation of air may be created when the vehicle is in motion to assist in removing or drying up any moisture which may happen to collect upon the front face of the window 15 and in carrying particles of dust by said window, thereby providing an additional security against any reduction in the light projected from the casing.

Also mounted upon the casing 1 is a second visor 20 herein secured, by means of a screw 21, to the under wall 22 of said casing and at a distance therefrom sufficient to provide a space 23. This visor may likewise be constructed of opaque or semi-transparent material and the function of said second visor is similar to the first except that it is not capable of obscuring any rays of light. Being downwardly inclined, this visor tends to maintain, when the vehicle is in motion, a circulation of air against the front window of the headlight and thus assist in keeping said window free from rain or other foreign matter.

To provide access to the interior of the casing for changing bulbs or for the purpose of cleaning the reflector from time to time, a portion of the lower wall 22 of said casing is hingedly connected at 24 to form a trap 25 which is normally closed but may be opened when necessity requires.

Where a very small opening like that shown at 15 is used to project rays of light upon the roadway, particularly on a clear night when used in combination with the visor 17, practically nothing but the pattern of light thrown upon the roadway in front of the vehicle will be visible to indicate to approaching motorists or pedestrians, the position of the vehicle carrying such headlight. Therefore means have been provided to illumine restricted portions of said vehicle, said means herein consisting of openings 26 (see Figs. 3 and 5) provided on opposite sides of the spheroidal reflector 3 preferably just below the lower edges of the ellipsoidal reflector 2. Cooperating with the openings 26 in said spheroidal reflector are windows 27 of appropriate transparent material arranged in the outer casing 1 so as to throw a pattern or predetermined area of light upon the mud guard of the vehicle or upon some other part adjacent to or in the rear of said headlight. Obviously the openings 26 and 27 may be varied at will to produce the desired pattern of light upon the motor vehicle.

The foregoing describes a headlight which, when the source of light is located about the rear focus of the ellipsoidal reflector means 2 as shown in Fig. 1, will project through the window 15 a pattern substantially as shown in Fig. 12, with the upper portion of the pattern terminating abruptly in a substantially horizontal line and having its region of greatest density near the upper center of said pattern, as is requisite for proper illumination for safe driving. This shape is due primarily to the fact that the ellipsoidal reflector is nearly, if not substantially, of semi-circular formation in transverse section and lines on the upper side of a plane containing the major axis thereof so that the rays projected from the reflector 2 through the focal point 13, will, upon their emission from said casing, form a pattern approximately the reverse of the transverse configuration of the reflector 2. This pattern will, with the forms of devices shown herein, have a lateral spread materially greater than its vertical spread.

It is well known to those skilled in the art that the projection of a predetermined pattern of light at predetermined angling from the light redirecting means requires that the source be located within certain limits about a predetermined point relative to the light redirecting means, usually the focus thereof, and that a departure of the source of light from these limits results in a material change in the pattern itself and/or in its angling relative to the light redirecting means. It is similarly well known that headlight bulbs in the majority of cases are not constantly maintained in proper focus, whether by lack of uniformity in manufacture and/or improper adjustment of the focusing means, etc. In the case of the above-described upper main reflector means 2, it will be obvious to those familiar with the art that the location of the concentrated source of light below and behind the focal point 4 will be followed by a lifting of the beam of once-reflected light projected by said main reflector means; and that the location of the source of light above and to the front of said focal point 4 will be followed by a lowering of said beam, in each instance as compared with the normal angling of the beam resulting from a normal location of the source of light about said focal point 4. It will also be obvious from Fig. 1 that the limiting to the plane 2—2 of the angle of elevation of rays emitted through the window 15 is in no wise dependent upon proper focusing of the source of light, as the aforesaid cooperating obturators define the maximum angle of elevation of the upper limiting boundary of the beam regardless of the position of the source of light within its said limits of adjustment. Improper focusing of the source of light may result in a reduction of intensity in portions of the pattern, but in the use of my invention proper focusing is easily accomplished by the layman by merely turning the adjusting screw 8 one way or the other until the upper portions of the pattern are of maximum brightness.

By employing different colored reflecting material or window glass at the aperture 15, or different colored bulbs, it will be obvious that various colors may be projected upon the surface to be lighted. Furthermore, the pattern of light, instead of being a sharply defined pattern of strong rays, may, by introducing semi-opaque visors and semi-transparent light-modifying material for the front wall 12 of the casing, such as colored glass, diminish in intensity upwardly from the region of greatest density of said pattern, providing, as it were, a twilight zone above the aforesaid design of relatively strong rays.

By a slight re-arrangement of the reflectors, the pattern of light projected thereby may be varied materially and an example of one such variation is shown in Fig. 13. In this pattern the upper edge 28 is shown arched due to the fact that the lower edges 29 of the reflector 2 are terminated slightly above the plane 2—2 so as to form angles with said plane and these extend substantially radially to the axis 4 of the source of light. It will be obvious that, by increasing the angles of these radial lines, the depth of the arch will be more or less pronounced.

Naturally the requirements of a light of the character herein described will vary. In some cases it will be desirable to have far stronger rays of light at the center than in others wherein it may be desirable to more uniformly distribute, at least the intense or strong rays of light, and, in Figs. 7 and 8, I have illustrated a form of light which is adapted to increase the proportion of light projected in the central portion of the pattern, for example, by providing a stepped ellipsoidal reflector 2a in combination with the spheroidal reflector 3 of the form shown in Figs. 1 to 5 inclusive. The reflector 2a embodies a series of ellipsoidal reflecting surfaces 2b alternating with risers 29, said ellipsoidal portions 2b having identical foci herein at 4b which may be, as in the previous example, the focal point of the spheroidal reflector 3 and also the axis of the source of light.

Desirably the risers 29 are radial with respect to the common or front focal point 13b of said reflector 2a so that any divergence of rays caused by the size of the source of light, will substantially overcome the very slight difference in angularity for the rays projected from the top of one of said ellipsoidal portions and from the bottom of the next forward ellipsoidal portion. As in the previous example, the ellipsoidal reflecting surfaces desirably extend in substantially semi-circular formation to the plane 8—8 containing the major axis of the headlight which, similarly to the previous case, extends from the axis of the source of light through the front focal point 13b and also through the front window of the headlight casing.

By reason of the stepped formation of said reflector 2a, the shape of the casing housing said reflector will be materially varied from that of the aforesaid form,—in the present case approximating a cigar shape and occupying less space than is required for the continuous ellipsoidal and spheroidal reflectors.

The use of a truncated normal semi-ellipsoid reflector such as shown at 2 (Figs. 1 and 2) or a stepped reflector such as shown at 2a in Figs. 7 and 8, and the arrangement of the front windows or light-emitting apertures of the casing substantially coinciding with the outer focal point of said reflector, insures practically all of the rays of light reflected therefrom converging in a small pattern about said focal point but it is to be understood that the invention is not limited to this arrangement. It is, however, desirable that the projection of rays be confined, as hereinbefore stated, within a pattern which has a small vertical spread but which may have a relatively wide horizontal spread. It is clearly within the scope and purpose of the invention to vary the arrangement of reflectors so as to project substantially parallel rays from said reflector to the light pattern for distant work and, to this end, in Fig. 9, I have introduced, in connection with the ellipsoidal reflector 2c, a paraboloidal element 30 located above a horizontal plane containing the axial line 2—2 which, in this example, coincides with the axis of the headlight as in the previous case and along which lies the axis of the paraboloidal element 30 and the major axis of the ellipsoidal portion 2c. The axis of the source of light 4c is, in this example, coincident with the focal point of said paraboloidal portion 30 and likewise of the rear focal point of said ellipsoidal portion 2c while the second focal point of the ellipsoidal portion 2c is arranged at a substantial distance in front of said source of light, herein approximately at the opening in the front wall of the casing as in the previous example and indicated by reference character 13c. The rays of light projected from the source 4c against the paraboloidal reflector 30 which, herein, extends around only a short distance, for example to the line 31, 31, will be reflected toward the front of the casing in substantially parallel lines c, c, thus throwing a beam of light of predetermined size for a considerable distance according to the power of the light source.

In Fig. 10 I have illustrated still another variation of the invention wherein the rays reflected by the main reflector are spread laterally so as to focus at two points instead of one, thus resulting in a materially increased lateral spread without any increase in vertical spread. To this end an ellipsoidal reflector 32 is employed which, in effect, is composed of two quadrant-like portions, the rear ends of which approximately form a semi-circular reflector. The forward ends of said quadrants are herein swung apart a predetermined distance horizontally and desirably about their common rear focal point 33 as a pivot so as to produce two focal points 34 and 34' for said rays substantially at the front opening 35 of the casing 36. Obviously the degree of separation of the two sections of the ellipsoidal reflector 32 may be varied and so correspondingly vary the distance between the focal points 34 and 34' but, by separating said quadrant sections, it will clearly be apparent that the opening 35 in said casing must likewise be elongated together with the front window 37 although, desirably the vertical dimension of said window, as shown most clearly in Fig. 11, will remain substantially the same as in the preceding figures.

In all of the forms herein described, the apertures in the front of the casing are relatively small, hence it is easy, with proper aiming of the headlight relative to the car, to obscure the source of light, the reflecting surfaces and all or part of the front window from opposing eyes in normal planes above the roadway. Furthermore, all of said forms, by reason of the focusing of the various rays substantially at the front opening, eliminate all danger of snow or ice collecting on said windows because of the presence of considerable heat generated by the focusing of said rays at that point.

A desirable feature of the last mentioned form of headlight is that the said windows will be somewhat larger than in previous cases and thereby be less likely to become closed or the light be cut off by mud or other foreign substances spattered or otherwise deposited upon the window and thus prevent the functioning of the reflectors.

It will be clearly apparent that the foregoing examples provide means arranged whereby, with proper focusing of the source of light, there is caused the projection of a pattern of light of the requisite character for safe driving, namely, with a region of relatively increased intensity in the upper parts of the pattern directed to the more distant portions of the roadway and with a substantial spread of relatively weaker intensity laterally and downwardly therefrom; whereby, with a proper aiming of the headlight relative to the car, the angle of elevation of substantially unmodified intense reflected rays relative to the car is positively limited to the normal maximum angle whether the source of light is properly focused or not; whereby, regardless of whether the source of light is properly focused or not, there is caused a non-glaring optical effect, as both the source of light and the reflecting surfaces (if not also all or part of the beam-emitting window) are substantially obscured from opposing eyes in planes of normal height above the ground; and also whereby these results are accomplished with little loss of light—as in any case there is utilized an unusually high percentage of the available rays generated by the source of light and, in those cases wherein it is elected to emit a pattern of relatively weak rays above the beam, there are utilized practically all of the available rays generated by the source of light. It is, however, to be understood that, within the scope of the appended claims, wide deviations may be made from the specific forms of the invention herein disclosed.

I claim:

1. A road vehicle headlight comprising, in combination, a casing having therein a reflector formed with an ellipsodial surface above a horizontal plane, means for supporting a source of concentrated light adjacent the focal point of said surface, an aperture at the end of said casing remote from said source, light-interrupting means immediately above said aperture, a visor like member in front of and above said aperture provided with a portion extending into proximity with said plane, said reflector formed to project a diverging beam of light with a substantially horizontal, flattened top portion passing immediately below said visor like member.

2. A road vehicle headlight comprising, in combination, a casing having an aperture for the emission of rays of light, a reflector in said casing having a surface which is substantially the upper half of an ellipsoid halved by a horizontal plane through its major axis and truncated at one end, means for supporting a source of concentrated light in said casing adjacent the focus of said reflector surface remote from said aperture, whereby said reflector will project a beam of light having a pattern with an upper boundary of relatively increased intensity and a substantial spread of relatively weaker intensity laterally and downwardly from said boundary, an obturator having a transverse, effective edge along its top, an obturator having a transverse, effective edge along its bottom, the last mentioned edge being farther from said focus than the first mentioned edge and the two edges acting to define the upper boundary of said beam.

3. A road vehicle headlight comprising, in combination, a casing having an aperture for the emission of rays of light, a reflector in said casing having a surface which is substantially the upper half of an ellipsoid halved by a horizontal plane through its major axis and truncated at one end, means for supporting a source of concentrated light in said casing adjacent the focus of said reflector surface remote from said aperture, whereby said reflector will project a beam of light having a pattern with an upper boundary of relatively increased intensity and a substantial spread of relatively weaker intensity laterally and downwardly from said boundary, an obturator having a transverse, effective edge along its top, an obturator having a transverse, effective edge along its bottom, the last mentioned edge being farther from said focus than the first mentioned edge and the two edges being in horizontal planes and acting to define the upper boundary of said beam, the obturator with the edge along its bottom formed to obscure, from points of view above said horizontal plane and in front of said aperture, the portions of said reflector lying above said plane.

4. A headlight according to claim 2, said reflector having an auxiliary surface which is substantially the lower half of a spheroid halved by a horizontal plane through its center, said center approximately coinciding with said focus, whereby rays emitted downwardly from said source of light are reflected upwardly through a relatively small area adjacent said focus and center for projection by said substantially ellipsoidal surface into a pattern of twice-reflected light forming part of said beam.

5. A headlight according to claim 2, said reflector including a lower part which is substantially the lower half of a spheroid halved by a horizontal plane through its center and which is arranged below said substantially ellipsoidal surface with its center approximately coinciding with said focus, whereby forward portions of said lower part of said reflector form said first mentioned obturator and rays emitted downwardly from said source of light are reflected upwardly against said ellipsoidal surface for projection by the latter into a pattern of twice-reflected light.

6. A vehicle headlight having, in combination, a source of concentrated light, an upper main reflecting surface formed with a curvature adapted to cause rays emitted upwardly from said source of light to be projected into a pattern of once-reflected light having a region of relatively increased intensity adjacent its upper boundary and a substantial spread of relatively weaker intensity laterally and downwardly from said region, an obturator carried by the headlight and having a transverse effective edge along its top, a visor-like member including a portion forming an obturator having a transverse effective edge along its bottom, means securing said member to said headlight to be carried by the latter with said last mentioned effective edge spaced forward from said main reflecting surface and being farther from said source than said first mentioned edge, said two effective edges acting to define said upper boundary of said pattern of light, and a lower auxiliary reflecting surface opposing said main reflecting surface and being formed with a curvature adapted to cause rays emitted downwardly from said source of light to be reflected upwardly against said main reflecting surface into a pattern of twice-reflected light to reinforce portions of said pattern of once-reflected light.

7. A vehicle headlight having, in combination, a casing having an aperture for the emission of rays of light, a substantially vertical glass closing said aperture, a source of concentrated light mounted within said casing, a reflector mounted within said casing and having an upper main portion and a lower auxiliary portion, said upper main portion having a working surface formed with a curvature whereby rays emitted upwardly from said source are redirected convergently-divergently relative to a horizontal plane to form a pattern of once-reflected light having a region of relatively increased intensity adjacent its upper boundary and a substantial spread of relatively weaker intensity laterally and downwardly from said region, an obturator carried by said headlight within said casing forward of said source of light and relatively near thereto, a transverse effective edge along the top of said obturator and behind said glass, a visor-like member, means securing said member to said headlight to be carried by the latter to extend forward from above said aperture, said member including a portion forming an obturator having a transverse effective edge along its bottom outside of said casing and spaced forward from said glass and first effective edge, said lower auxiliary portion of said reflector having a substantially hemi-spheroidal working surface extending below and behind said first mentioned effective edge, said auxiliary portion adapted to cause rays emitted downwardly from said source to be reflected upwardly against said main portion of said reflector through a relatively small area in proximity to said source of light, whereby a re-directing of said downwardly emitted rays by said main portion of said reflector imposes upon said pattern of once-reflected light a pattern of twice-reflected light having substantially the same aiming and light distribution characteristics as said once-reflected pattern of light, said two effective edges acting to define the upper boundary of said once-reflected and said twice-reflected patterns of light.

8. A headlight according to claim 2, including means associated with said supporting means for adjustable movement of said source of light within definite limits including a small area adjacent said focus, said obturators being constructed and arranged to prevent the escape from the headlight through said aperture of any concentrated rays redirected by said reflector into planes above said boundary as a result of said source of light being at a point within said limits of adjustment not included within said small area.

9. A vehicle headlight having, in combination, a casing having an aperture for the emission of rays of light, a source of concentrated light, an upper main reflecting surface formed with a curvature adapted to redirect rays emitted upwardly from said source into a beam of once-reflected light having a region of relatively increased intensity in planes approximately just below a sharp cut-off forming the upper boundary of said beam upon locating said source of light within a relatively small area forming its normal operating position about a predetermined point relative to said reflecting surface, means for mounting said source of light for adjustable movement relative to said reflecting surface within definite limits including said small area, a lower auxilliary reflecting surface adapted to cause rays emitted downwardly from said source to be reflected upwardly against said first reflecting surface, whereby said downwardly emitted rays are redirected by said main reflecting surface into a beam of twice-reflected light imposed upon said beam of once-reflected light to reinforce portions of the same, obturator means carried by the headlight and having an upwardly extending effective edge in front of said source of light and a downwardly extending effective edge farther to the front of said source, said two obturators being positioned to prevent the escape from the headlight through said aperture of any rays abnormally redirected by said reflecting surfaces into planes above said cut-off as a result of said source of light being within said limits of adjustment at a point not included within said small area.

10. A vehicle headlight having, in combination, a source of concentrated light, a reflecting surface formed with a curvature whereby, upon positioning said source of light in its normal operating position relative thereto, said reflecting surface will redirect rays emitted upwardly and downwardly from said source into a beam of light having a region of relatively increased intensity adjacent its upper boundary and a substantial spread of relatively weaker illumination laterally and downwardly from said region, means for mounting said source of light in said normal operating position, obturator means presenting respectively upwardly and downwardly facing effective edges, means supporting said obturator means to be carried by the headlight in fixed relation to said reflecting surface, said effective edges acting to define said upper boundary, the elements of the headlight including said obturator means being constructed and arranged whereby concentrated rays substantially unmodified after redirection by said reflecting surface are emitted from the headlight to form said region of relatively increased intensity upon positioning of said source of light within said normal operating position, but are prevented from escaping from the headlight upon being abnormally redirected by said reflecting surface into planes above said boundary as a result of said source of light being located within said headlight away from its said normal operating position, said obturator means substantially obscuring said reflecting surface from points of view above said boundary.

11. A headlight according to claim 2, including a semi-opaque member arranged opposite said truncated end in planes above said effective edges, whereby rays modified by said member pass out of the headlight to form a relatively weak pattern of light above said upper boundary of said beam, and means for causing relatively weak rays to be emitted from the headlight to illuminate portions of the vehicle adjacent thereto.

12. A vehicle headlight having, in combination, a casing having an aperture for the emission of rays of light, a source of concentrated light, means for redirecting a substantial amount of the light from said source into a pattern of light having a region of relatively increased intensity adjacent its upper boundary and a substantial spread of relatively weaker intensity laterally and downwardly from said region, an obturator carried by the headlight and having a transverse effective edge along its top relatively near said source of light, a visor-like member extending forward from above said aperture and including a portion forming an obturator having a transverse effective edge along its bottom, means securing said member to the headlights to be carried thereby with said last mentioned effective edge spaced forward from said light redirecting means relatively farther from said source then said first mentioned effective edge, said two effective edges acting to define said upper boundary of said beam.

In testimony whereof, I have signed my name to this specification this 6th day of August, 1925.

JOSEPH BRADFORD WARDWELL.